Oct. 20, 1953          L. J. BERBERICH ET AL          2,656,290
       PROCESSES FOR PRODUCING ELECTRICAL COILS INSULATED WITH
          MICA AND SYNTHETIC RESINS AND THE PRODUCTS THEREOF
Filed June 21, 1952                                   3 Sheets-Sheet 1

WITNESSES:
H. F. Susser
Wm. C. Groome

INVENTORS
Leo J. Berberich and
Harold M. Philofsky.
BY
Frederick Shapoe
ATTORNEY

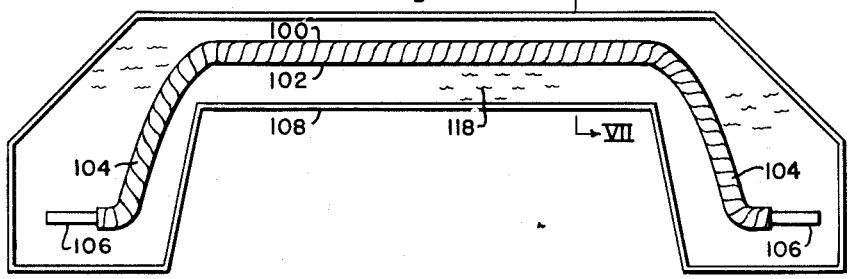
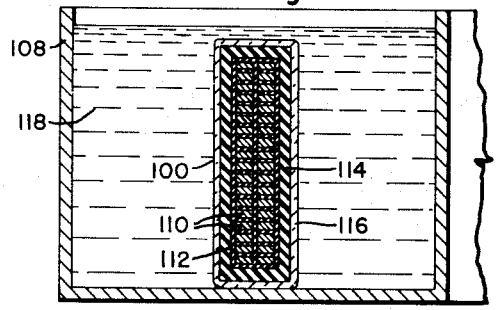
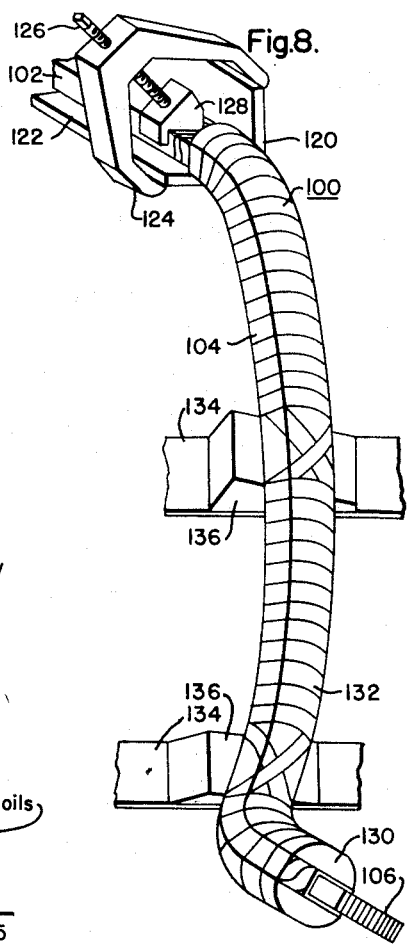
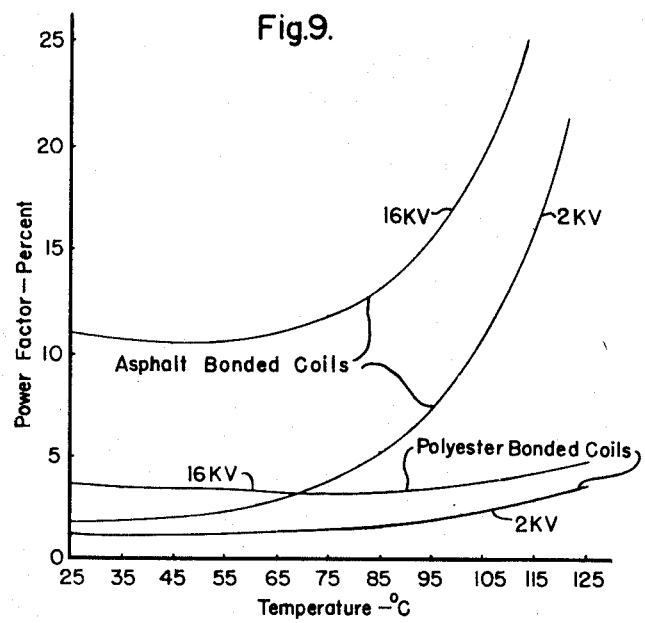

Patented Oct. 20, 1953

2,656,290

UNITED STATES PATENT OFFICE 2,656,290

PROCESSES FOR PRODUCING ELECTRICAL COILS INSULATED WITH MICA AND SYNTHETIC RESINS AND THE PRODUCTS THEREOF

Leo J. Berberich and Harold M. Philofsky, Pittsburgh, Pa., assignors to Westinghouse Electric Corporation, East Pittsburgh, Pa., a corporation of Pennsylvania Application June 21, 1952, Serial No. 294,896

27 Claims. (Cl. 154—2.28)

This invention relates to insulated electrical conductors, windings, coils and the like embodying mica and synthetic resin impregnants.

This application is a continuation-in-part of our copending application Serial No. 57,008 filed October 28, 1948, entitled Electrical Coils Insulated with Mica and Synthetic Resins, now abandoned, and applications Serial No. 77,114 filed February 18, 1949, and Serial No. 161,232 filed May 10, 1950, both now abandoned.

In the building of electrical apparatus, particularly high voltage generators and the like, in which the voltage is above 1,000 volts, one of the problems has been the sharp increase in power factor with increase in the applied voltage. As an example, a coil that at 25° C. had a power factor of approximately 2% when tested at 2 kv., at 16 kilovolts had a power factor of 12%. This sharp rise in power factor, while in itself undesirable, indicates that the overall insulation is not at its optimum and possesses air pockets, voids or flaws. Therefore, corona may occur and premature breakdown with electrical failure will take place much sooner than if more perfect and completely filled insulation were present. Furthermore, the power factor usually increases rapidly with increasing temperatures, and power-factor values of as high as 25% at 125° C. are not uncommon in some of the insulation used at present.

A portion of the difficulties encountered in such insulated conductors previously made may be traced to the insulating materials used. Up to 20 years ago shellac was employed as a binder for mica insulation on high voltage conductors. Conductors so insulated had several drawbacks, one being due to the brittleness of the shellac and its lack of flexibility, and another being the swelling of the insulation in use. Also the end turns of coils could not be treated or insulated with shellac and this led to many difficulties. At the present time it is almost the universal practice in the electrical industry to employ mica tapes bonded with a high melting point asphalt for the insulation on high voltage coils. While satisfactory in low temperature service, asphalt, being thermoplastic, will exude or bleed from the coil end-turns when the conductors are subjected to temperatures somewhat over 100° C. Asphaltic binders for mica have other disadvantages in that they have been found to inhibit polymerization of many impregnating resins so that such impregnating resins do not polymerize or cure adequately if used therewith. Asphalts also are characterized by high dielectric losses at high temperatures.

In the larger generators, in particular those with a rating of 12,500 kva. and higher, the length of the field windings has given rise to certain difficulties. Asphalt bonded insulation, which has been the standard in the field windings for all the larger generators, is a plastic material. Due to the relative difference in expansion between the field windings and the magnetic cores in which they are disposed, upon alternate heating and cooling when the generator is put into operation and taken out of operation there results a migration of the asphalt bonded insulation on the conductors. In some cases, after a number of years of service, the ends of the windings have exhibited separation of the asphalt bonded insulation due to such migration. Air pockets or spaces result from such migration and this enables corona to occur with destruction of any organic portions of the insulation. These deficiencies in asphalt bonded insulation have become progressively more pronounced as the size of generators has increased.

Heretofore the preparation and processing of high voltage coils and windings has been time consuming, difficult and involved. A widely used procedure, briefly, was to wrap a conductor with a few layers of asphalt bonded mica tape, impregnating the applied tape with hot asphalt under vacuum, then under pressure and cooling, then wrapping several more layers of mica tape on the conductor, again vacuum and pressure impregnating the applied tape, and so on, until the total number of layers of tape had been applied and all asphalt impregnated in successive steps. The process involved repeated handling of tacky asphalt covered coils and tapes. Uniformity of quality was obviously difficult to obtain.

The object of this invention is to provide processes for producing windings embodying mica and thermoset resins combined to produce an elastic insulation having outstanding properties.

Another object of the invention is to provide electrical windings insulated with solid voidless insulation comprising mica and a thermoset resin which possesses low losses at all temperatures of use.

A still further object of the invention is to provide a process for rapidly and economically impregnating mica tape insulation applied to a conductor with a completely reactive polymerizable composition.

Other objects of the invention will in part be obvious and will in part appear hereinafter. For a better understanding of the nature and objects of the invention, reference should be had to the following detailed description and drawings, in which:

Fig. 6 is a plan view of a modified form of impregnating tank;

Fig. 7 is an enlarged cross section on lines VII—VII of Fig. 6;

Fig. 8 is a fragmentary view in elevation of a half coil in a confining and sizing die and forming jig;

Fig. 9 is a graph plotting power factor against temperature for certain high voltage coils prepared in accordance with the present invention and with the best prior art practice;

Figure 1:
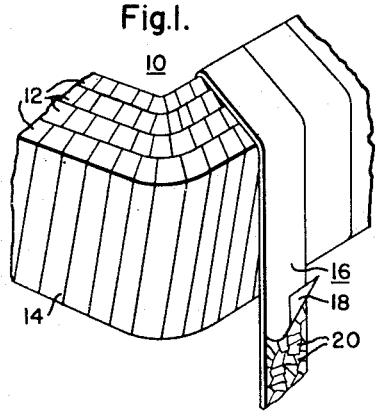
Figure 1 is a fragmentary perspective view of a coil being wrapped with a composite mica insulating tape.

We have discovered a novel process for rapidly and efficiently preparing high voltage coils and windings from a particular composite mica insulation and thermosettable completely reactive polymerizable compositions. In accordance with our process, we have overcome many of the problems that have rendered it difficult to produce such coils and windings heretofore. The insulated coils so produced possess novel and highly useful characteristics.

Briefly, our invention comprises, initially, the preparation and use of composite mica tape or mica wrapper insulation embodying a fluid binder composed of one or more liquid resinous binder compositions having a viscosity of between 25 and 10,000 poises at 25° C. Such resinous binders may comprise liquid resinous polymers alone or polymers rendered liquid by the addition of plasticizers. They are stable and relatively non-volatile and non-depolymerizing at room temperature and at all normal operating temperatures of machines embodying them, so that the composite mica insulation may be handled, stored and used without loss of properties. Our application copending herewith Serial No. 161,231, filed May 10, 1950, discloses in detail the preparation of such composite mica tape insulation. A composite mica tape embodying these liquid resinous binders has been found to cooperate in a novel and unexpected manner with completely reactive liquid polymerizable compositions. As much as 16 layers and more of the composite mica tape with a liquid binder can be completely impregnated in one operation with a liquid completely reactive polymerizable composition, whereas any previously available mica tape resisted the complete penetration of any type of impregnating varnish or composition beyond four layers of mica tape and usually the impregnation was incomplete and erratic beyond the fourth layer of mica tape. Furthermore, such liquid resinous binders having a viscosity of between 25 and 10,000 poises at 25° C. are compatible, both before and after polymerization, with selected completely reactive resinous compositions, so that upon polymerizing of the latter there is secured a uniform homogeneous solid of optimum electrical insulating qualities.

The composite mica tape and mica wrapper employed in the practice of the present process comprises at least one pliable sheet forming a base or backing for a layer of mica flakes and a liquid resinous binder of a viscosity of between 25 and 10,000 poises at 25° C. Ordinarily, we prefer to have the composite mica tape include two pliable sheets between which the layer of mica flakes is disposed, since such tape is stronger and easier to handle and to apply to electrical windings. It should be understood that the term "composite mica tape" includes not only what is normally considered to be a tape, that is a strip of up to several inches in width, but includes also wider sheets which are applied by winding or wrapping on coils or conductors.

The pliable sheet backing for the composite mica tape may, for example, be rope paper, cotton cambric, asbestos paper, glass cloth, asbestos cloth or a sheet or cloth of synthetic resins such as polyethylene sheet, nylon cloth and linear polymethylene terephthalate fabrics or films. The mica flakes are applied to the sheet backing in a layer of any suitable thickness. For high voltage insulation, it has been found that a sheet backing material of approximately 1 mil in thickness with from 3 to 10 mil thick layer of mica flakes gives excellent results.

The liquid binders for the mica flakes and the sheet backing may comprise any one or more of a numerous group of stable liquid resinous polymers. The following are examples of liquid binders that have been used in preparing suitable mica tape insulation, the polymer being employed in the proportions indicated based on the total weight of the entire insulation.

TABLE I

| Polymer | Approximate Molecular Weight | Percent Bond in Tape |
| --- | --- | --- |
| Polymethylmethacrylate | 1,000 | 10 |
| Poly-α-methyl styrene | 4,000 | 16.4 |
| Polystyrene | 1,500 | 11.2 |
| Coumarone-indene | 1,000 | 6 |
| Polyalphamethylstyrene | 3,000 | 3 to 25 |
| Polymers of styrene and coumarone mixtures | 6,000 | 8 |
| Linear polyester of diethylene glycol and azelaic acid | 1,500 | 10 |

More generally, the liquid binders may be selected from liquid linear polyesters of glycols and mono- or dicarboxylic acids or anhydrides of the latter; arylalkene polymers; polymers of a compound having the formula

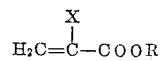

where X represents a monovalent radical selected from the group consisting of hydrogen and saturated aliphatic and cycloaliphatic hydrocarbon radicals and R is selected from the group of monovalent radicals consisting of hydrogen and saturated aliphatic hydrocarbon radicals; coumarone and indene polymers; and polyethylene as well as compatible mixtures of any two or more thereof. Reference should be made to our application Serial No. 161,231, filed May 10, 1950, for fuller details with regard to these liquid binders.

We have also employed a binder composed of from 15% to 75% by weight of polystyrene of a molecular weight between 30,000 and 250,000 and from 85% to 25% by weight of a plasticizer selected from the group of liquid polycyclic hydrocarbons boiling above 270° C. and having a viscosity between 0.5 and 5 poises at 25° C., the group consisting of terphenyls hydrogenated at least 40% or the mono-, di- and polyamyl naphthalenes. The composition is a viscous liquid having a viscosity of between 25 and 10,000 poises at 25° C.

The hydrogenated terphenyl may be produced in any number of ways. Thus, it may be produced by pyrolytic decomposition of benzene, as set forth in Patent No. 2,364,719, or it may be produced by reacting benzene and cyclohexyl bromide in the presence of aluminum chloride, thereby producing isomeric dicyclohexyl benzene, as set forth by von Braun Ber. 60, 1180. A specific product that has been found satisfactory for the purpose, is an isomeric mixture of ortho, meta, and para terphenyls approximately 55% hydrogenated which mixture has a distillation range of from 345° C. to 425° C. and a viscosity of approximately 0.8 poise at 25° C.

Monoisoamyl naphthalene boiling in the range of 280° C. to 330° C., diamyl naphthalene boiling in the range of 330° C. to 365° C. and having a viscosity of 0.9 poise at 25° C., and polyamyl naphthalene boiling in the range of 355° C. to 400° C. and having a viscosity of 5.5 at 25° C., individually or in admixture may be employed in combination with polystyrene with satisfactory results. The following table sets forth the viscosities of a number of compositions produced in accordance with the invention.

TABLE II

[Viscosity of various plasticized polystyrenes]

| Plasticizer | Plasticizer Content, Percent by Wt. | Viscosity, poises at 25° C. | | |
| --- | --- | --- | --- | --- |
| | | Polystyrene, MW=65,000 | Polystyrene, MW=100,000 | Polystyrene, MW=150,000 |
| Hydrogenated Terpenyl —55% | 75 | 5,200 | 9,500 | |
| Do | 83.3 | 520 | 850 | 2,750 |
| Polyamyl Naphthalene | 83.3 | | 75 | |
| Do | 75 | | 600 | |
| Do | 50 | | 5000 | |

The composition composed of polystyrene and polycyclic hydrocarbon plasticizer is dissolved in a volatile solvent such as a benzenoid hydrocarbon solvent, such as benzene, toluene or xylene, or various mixtures thereof, preferably in the proportions of from 70% to 90% of the solvent to 30% to 10% by weight of the composition to produce a thin solution. The resulting solution is applied to the mica flakes and sheet backing by dripping, brushing or the like, and the solvent evaporated by applying heat, or heat and evacuation, to the treated mica tape. A thin sheet of tissue paper or cellophane may be applied over the mica tape so produced to permit it being rolled up since the plasticized polystyrene composition is extremely viscous and tacky. The tapes may be of any desired width. The mica insulation so produced is permanently flexible and does not age, harden or deteriorate appreciably upon being stored for appreciable periods of time.

For most applications involving the preparation of high voltage conductor insulation, we prefer that the proportion of the liquid binder not exceed 25% of the weight of the composite mica tape. Exceptionally good insulation has been achieved with composite mica insulation embodying from 3 to 7% by weight of the liquid resinous binder. An example of a tape found to give excellent results in practice was one comprising two sheets of 1 mil thick supercalendered rope paper between which was introduced a layer of from 3 to 5 mils thickness of mica flakes of an average diameter of over 1" and from 3 to 7% by weight of polyalphamethylstyrene of an average molecular weight of between 400 and 2,000, the polymer with an average molecular weight of 500 had a viscosity of approximately 2,000 poises at 25° C. The composite tape so produced feels and appears to be dry but is bonded together extremely well and possesses great strength so that it can be taped firmly upon conductors without loss of mica flakes. We have prepared such mica tapes using mica flakes of an average area of 10 square inches and others in which the mica flakes were a small fraction of a square inch in area.

The practice of the present invention will be described particularly with reference to high voltage coils and windings. Referring to Fig. 1 of the drawing, there is illustrated a winding 10 comprising a plurality of turns of conductors 12. Each turn of the conductor 12 is composed of copper wrapped with turn insulation 14. The turn insulation 14 is preferably prepared from a fibrous material impregnated with a bonding resinous insulation. Such bonding resinous insulation may consist solely of a coating of uncured varnish or resin; however, it is preferred that the turn insulation comprise a wrapping of fibrous material treated with a bonding resin. Copper conductors wrapped with glass sliver as disclosed in J. J. Keyes patent 2,370,046 are well suited for use in the practice of the present invention. However, glass fiber cloth, paper asbestos cloth or asbestos paper treated with a resin can be used. The resin applied to the turn insulations to bond them together may be a phenolic resin, an alkyd resin, a melamine resin, a methyl phenyl polysiloxane resin or the like, or mixtures of any two or more of these. It is usually desirable to treat a plurality of turns of conductors, each provided with bonding resinous turn insulation, as follows, first, shaping the individual conductors into desirable form and then placing the assembled plurality of turns in a heated molding press where the conductors are compressed together and the resin comprising the turn insulation is heated and cured to bond the conductors into a shaped unit coil or winding.

It should be understood that the insulation 14 is not adequate for withstanding the severe voltage gradients that will be present between the conductor and ground. The ground insulation for the coil or winding is provided by wrapping one or more layers of a composite mica tape 16 about the assembled and bonded turns 12. The composite tape 16 comprises a pliable backing sheet 18 and a layer of mica flakes 20 bonded together with the liquid resinous binder. The tape 16 may be applied half lapped, butted or otherwise. Ordinarily, a plurality of layers of the composite tape are applied up to a total of 16 and more layers, each layer having a thickness of 5 to 7 mils each, for the highest voltage service of the order of 13,800 volts and higher.

Figure 2:
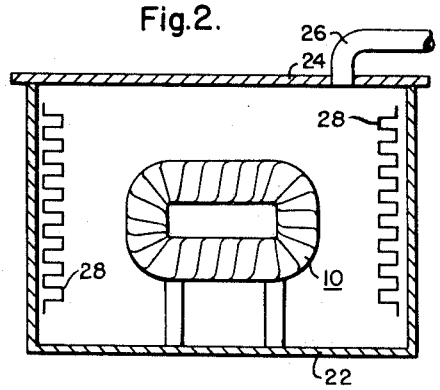
Fig. 2 is a cross-sectional view in elevation of a drying oven with a wrapped coil therein.

After having been wrapped with the mica tape 16, the wrapped winding 10 is preferably subjected to a drying and evacuating operation to remove all moisture, air, and other volatile material from the winding. As illustrated in Fig. 2 of the drawings, the winding is subjected to this treatment in an enclosed chamber 22 provided with a vacuum-tight cover 24 having a conduit 26 leading to a vacuum pump. Heating elements 28 are present within the chamber 22 to produce a predetermined elevated temperature. The temperature within the vacuum chamber 22 should not be in excess of 175° C. Particularly good results have been obtained when the drying procedure is carried out at temperatures of from 100° C. to 120° C. Temperatures lower than 100° C. may be employed, but they require a high vacuum and longer treatment time to secure as good results. The vacuum applied to the chamber 22 through the conduit 26 may be in the range of from 0.1 to 10 millimeters of mercury. We have secured good results in less than one-half an hour under these conditions of vacuum and temperature. Longer heat treatment, as, for example, two to four hours, may be employed. As will be explained subsequently, the evacuating step may be deferred and only heating effected. During the vacuum and heating process, moisture present in the coil, volatile solvent present in small quantities in the liquid resinous binder in the mica tape, and very low molecular weight fractions of the binder are removed. When so treated in the chamber 22, the coil is particularly well suited for varnish impregnation treatment.

Excellent results are obtained by applying vacuum simultaneously with the heating of the wrapped winding. However, good results have been secured by simply heating the wrapped winding for several hours up to as much as one week at temperatures of the order of 100° C. to 150° C. before applying vacuum thereto. While the optimum results have been obtained with vacuum applied at the time that the coil is at a high temperature, we have secured good results where the coils after baking were cooled to room temperature or below 50° C. before the vacuum was applied. A vacuum at an absolute pressure of 5 millimeters of mercury was adequate. In each instance, the major proportion of the resinous liquid binder in the composite mica insulation was not removed during the heating and evacuation cycle. At most only a minor proportion of the liquid binder volatilized and escaped. It should be understood that with certain liquid binders it would be undesirable to use the highest temperatures and highest vacuum treatment for any length of time inasmuch as their relative vapor pressure is such that an excessive amount thereof would be removed.

The heated and evacuated winding free from moisture, air and other volatiles is cooled to 50° C. or below in preparation for impregnation of the winding with a completely reactive liquid polymerizable compositon. The windings after such heating are exceptionally well suited for impregnation with completely reactive compositions which are often called "solvent reactive varnishes." The cooling is desirable to prevent overheating of the polymerizable composition which may react in the impregnating tank if too warm.

It should be understood that a single conductor, or a plurality of unbonded conductors, or separate coils may be treated in a similar manner to the winding 10.

For the most rapid processing we have found the preferred process to involve (1) heating the wrapped winding up to as much as 175° C. to drive off moisture and volatiles, (2) cooling the wrapped winding to a temperature of not substantially in excess of 50° C. or somewhat less, (3) promptly placing the winding in a vacuum impregnating tank and drawing a vacuum to remove gases in the wrapping, (4) flooding the evacuated winding with a liquid completely reactive polymerizable composition, with atmospheric or higher pressure applied to the surface of the liquid composition to assist impregnation, and (5) curing of the applied impregnant.

Completely-reactive compositions suitable for use in the process may include any fluid polymerizable composition, ordinarily with a catalyst, that, upon being heated to a predetermined temperature, polymerizes into a thermoset, relatively-hard resinous body. The fluid resinous composition may comprise a single polymerizable component such, for example, as diallyl phthalate, diallyl succinate, diallyl maleate, diallyl adipate, methallyl acrylate, diallyl ether, allyl acrylate and allyl crotonate. It will be noted that such compositions comprise at least two unsaturated >C=C< groups capable of vinyl-type addition polymerization. Good results have been secured with monomers containing two or more of these unsaturated groups capable of polymerization upon being subjected to a polymerization catalyst and heat. It will be understood that mixtures of any two or more polymerizable monomers, for example 95% monostyrene and 5% of divinyl benzene, may be employed.

Numerous other completely-reactive multi-component polymerizable compositions are known to the art. Such compositions include, in many cases, an unsaturated resinous component—particularly an unsaturated polyester resin—and an unsaturated polymerizable liquid monomer. Particularly good results have been secured by employing as the polyester resin the reaction product of an ethylenic dicarboxylic acid or anhydride thereof such, for example, as maleic acid, fumaric acid, maleic anhydride, monochloromaleic acid, itaconic acid, itaconic anhydride, citraconic acid and citraconic anhydride. The unsaturated dicarboxylic acid or anhydride or mixtures thereof are reacted with a substantially molar equivalent of a polyhydric alcohol such as ethylene glycol, glycerol, propylene glycol, diethylene glycol, or pentaerythritol or mixtures thereof. Castor oil has been employed successfully in reactions with maleic anhydride, and the resultant castor oil maleate ester admixed with a polymerizable unsaturated monomer, for example, monostyrene, in the proportions of from 10 to 95 parts by weight of the monostyrene and from 90 to 5 parts by weight of the ester. In the preparation of the unsaturated alkyd esters, an ethylenically unsaturated alpha-beta dicarboxylic acid or anhydride may be replaced with up to 95% of the weight thereof by a saturated aliphatic dicarboxylic acid or aryl dicarboxylic acid or anhydride, such, for example, as succinic acid, adipic acid, sebacic acid, phthalic acid, phthalic anhydride or the like. Also, mixtures of polyhydric alcohols may be employed. In some instances, epoxides have been employed in lieu of glycols, particularly in reactions with dicarboxylic acids instead of their anhydrides.

The resulting alkyd esters may be dissolved in a liquid unsaturated monomer having the group >C=C<. Suitable liquid unsaturated polymerizable monomers are: monostyrene, alphamethylstyrene, 2,4-dichlorostyrene, paramethyl styrene, vinyl acetate, methyl methacrylate, ethyl acrylate, diallyl phthalate, diallyl succinate, diallyl maleate, allyl alcohol, methallyl alcohol, acrylonitrile, methyl vinyl ketone, diallyl ether, vinylidene chloride, butyl methacrylate, allyl acrylate, allyl crotonate, 1,3-chloroprene, and divinyl benzene, as well as mixtures of two or more of any of these monomers.

An excellent completely reactive composition is one composed of a solution in from 90 to 50 parts of arylalkene polymerizable monomer of from 10 to 50 parts by weight of the alkyd reaction products of (A) an unsaturated acidic compound from the group consisting of maleic acid, maleic anhydride, fumaric acid, citraconic acid and citraconic anhydride in admixture with one or more saturated straight chain dicarboxylic acids having the carboxyl groups disposed at the end of the straight chain, the chain having from 2 to 10 non-carboxyl carbon atoms and no other reactive groups, and (B) a molar equivalent, within ±10%, of an aliphatic saturated glycol having no other reactive group than the hydroxyl groups. The proportion of the unsaturated acidic compound in the mixture of acids should be between 5% and 50% of the weight of the mixture. Suitable saturated dicarboxylic acids are adipic acid, sebacic acid, azelaic acid, suberic acid, succinic acid, decamethylene dicarboxylic acid and diglycolic acid and mixtures thereof. With the longer chain saturated dicarboxylic acids, as, for example, sebacic acid, the proportion of maleic anhydride, for example, may be higher than if the saturated acid were all succinic acid, if cured products of similar degrees of hardness are desired. Suitable glycols for reaction with the mixture of saturated and unsaturated acids are ethylene glycol, propylene glycol, diethylene glycol, 1,5-pentanediol and triethylene glycol. Mixtures of the glycols are suitable for producing the reaction product. The reaction of the (A) acidic compounds and (B) the glycols may be carried out by heating in a reaction vessel at temperatures of from 100° C. to 250° C. for from 24 hours to 2 hours to a low acid number of below 60.

The following are specific examples of the preparation of the unsaturated alkyd reaction products to be dissolved in the vinyl aryl monomer:

Example I

A mixture of 44 mole percent of adipic acid and 6 mole percent of fumaric acid was combined with 50 mole percent of propylene glycol and reacted with $CO_2$ sparging, for about 4 hours at 140° C. in a closed reaction vessel, after which the temperature was raised to 220° C. over a 4-hour period and the reaction was continued at 220° C. for 8 hours. A syrupy polyester resin was produced.

Another composition comprised the reaction product of 10 mole percent of maleic anhydride, 40 mole percent of adipic acid, and 50 mole percent of diethylene glycol.

Example II

A reaction product was prepared by reacting 30 mole percent of sebacic acid, 20 mole percent of maleic anhydride, and 50 mole percent of diethylene glycol under the same conditions as in Example I with a syrupy resin of low acid number resulting.

The unsaturated esters or alkyd resins of these two examples so prepared are dissolved in a monomeric compound having the reactive group >C=C< such as monostyrene or a simple substitution derivative of monostyrene, or a mixture of two or more monomers, as above described, to produce low viscosity, completely reactive solutions having present from 10% to 50% by weight of the unsaturated ester. Particularly good results have been obtained by dissolving the unsaturated esters in the monostyrene to produce solutions containing from 50% to 85% by weight of monostyrene and the balance, 50% to 15% by weight, composed of the unsaturated esters.

The above fluid resinous compositions will polymerize completely upon heating in the presence of one or more vinyl-type polymerization catalysts, such as benzoyl peroxide, lauroyl peroxide, methyl ethyl ketone peroxide, t-butyl hydroperoxide, ascaridole, tert-butyl perbenzoate, di-t-butyl diperphthalate, ozonides, and similar catalysts, in an amount of from 0.1% to 2% and more, by weight. Polymerization accelerators such as cobalt naphthenate and other driers may be employed. The proportion of the catalyst obviously may be present in amounts differing from these percentages.

Figure 3:
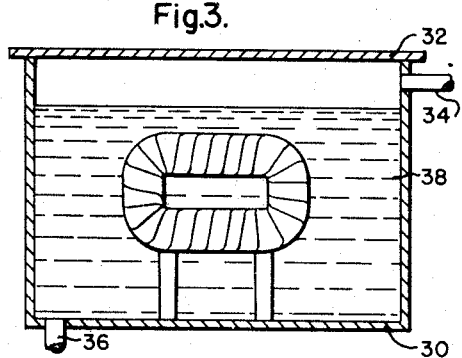
Fig. 3 is a vertical section through an elevation of an impregnating tank.

Referring to Fig. 3 of the drawings, there is illustrated the impregnating step using apparatus adapted for treating the winding 10 with a completely polymerizable reactive composition. The apparatus comprises a tank 30 and a sealable cover 32 applied thereto in which tank is present a conduit 34 for exhausting air or for introducing gas under pressure. A varnish feed and withdrawal pipe 36 leads into the bottom of the tank 30. The winding 10 may be withdrawn from chamber 22 and placed within the tank 30 and subjected to a vacuum by means of the conduit 34 to remove air and gases therefrom. Thereafter, while the tank is still evacuated, the completely reactive composition 38 is introduced through the pipe 36 to submerge the winding 10. After the winding is completely covered with composition 38, atmospheric air or a gas such as nitrogen under pressure then may be introduced through the conduit 34 to assist the composition 38 in penetrating the interstices of the winding to assure more complete filling thereof, although this is usually unnecessary owing to the low viscosity of the composition, and the fact that the compatible liquid binders allow ready penetration of the compositions through the tape. The impregnation treatment need not be long, ten minutes under pressure is ordinarily sufficient to completely impregnate and saturate small windings, however longer impregnation times of several hours insure the most complete saturation of the larger windings. Thereafter, the composition 38 is drained from the tank through the pipe 36, and the coil 10 may be removed from the impregnating tank.

Figure 4:
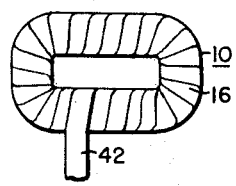
Fig. 4 is a plan view of an impregnated winding being wrapped with a resin impermeable tape.

The completely reactive composition impregnated in the winding is fluid and uncured. It is desirable that prior to its curing, the winding be shaped and formed in order to compact the various layers of the insulation together and to form the entire winding 10 to predetermine dimensions so that it will fit snugly in an electrical machine. For this purpose, the winding 10 after impregnation is wrapped immediately with a relatively impervious and insoluble tape 42 as illustrated in Fig. 4. Particularly good results have been secured with plastic or resinous tapes which are not subject to attack by the impregnating composition. We have employed tapes prepared from cellulose acetate, polyvinyl alcohol, polyvinylidene chloride, polytetrafluoroethylene, synthetic rubbers, such as chloroprene rubber, polyethyleneglycol-terephthalate polymer and polyethylene. Five mil thick tape, one inch wide, applied half-lapped, has been satisfactory. We have successfully used one mil thick tape, 1½ inches in width, composed of polyethylene glycol-terephthalate polymer. In some cases we have applied one layer of polytetrafluoroethylene tape and covered this over with a thinner and more elastic polyethylene tape wrapping. The polytetrafluoroethylene stripped very readily from the coils after curing of the resin. The applied tape serves a number of purposes. This impervious tape wrapping minimizes the loss of the composition during subsequent curing of the resin, it helps to confine the insulation, particularly on the end-turns, and facilitates removal of the coil from the sizing and curing molds.

Figure 5:
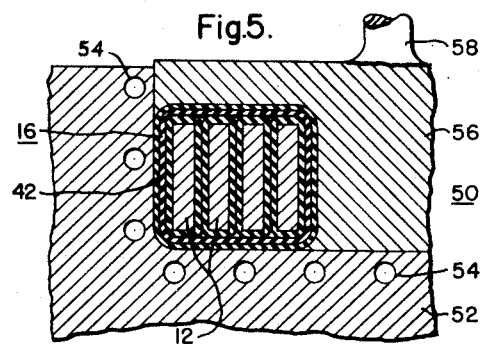
Fig. 5 is a fragmentary cross section through an elevation of a molding press having a coil therein.

After the winding has been wrapped with the tape 42, it is placed in a heated mold for the purpose of compacting the insulation and turns, and curing the completely reactive composition present therein. Various types of molds may be used. Referring to Fig. 5 of the drawings, there is illustrated a cross section through one side of the winding 10 as disposed in a sizing and curing press 50. The press 50 comprises a relatively stationary mold base 52 in which are apertures 54 for steam or electrical heating elements, or the like. A movable die 56 operated by ram 58 cooperates with the base 52 to compress the winding 10 to size. While so compressed to a desired size and shape, the winding 10 is heated to a temperature high enough to cure the completely reactive composition to a thermoset condition. Suitable temperatures are from 70° C. to 150° C. One hour at a temperature of from 80° C. to 100° C. followed by heating for from one-half to five hours at a temperature of 125° C. will insure complete curing of the solvent reactive composition of Examples I and II. The winding may be heated by the passage of electrical current therethrough and the base 52 need not be heated.

After the varnish insulation has been fully cured, the winding may be removed from the die and cooled to a temperature at which it can be conveniently handled. The tape 42 is then stripped from the winding. The coil is ready for use in high voltage generators and similar electrical machinery. It is uniform and compact, and free of voids or air pockets. It contains no excess of resin. The liquid binder is distributed in the cured completely reactive composition and forms a compatible homogeneous resin body. An important function of the liquid resinous binder in the tape is to plasticize the thermoset composition to render it more elastic and tough.

Numerous types of electrical conductors, coils or windings may be treated in accordance with the present invention. For example, hairpin coils, field coils, rotor coils, bobbin wound coils, pancake coils and the like which lend themselves to application of the composite mica insulation may be processed as disclosed herein.

An example of the preparation of a high voltage generator half coil in accordance with the present invention will now be described particularly with reference to Figs. 6, 7 and 8 of the drawings. The half coil 100 is composed of a plurality of conductors with turn insulation, preferably arranged in transposition, which have been molded in a hot press and formed into a bonded coil having a relatively long slot section 102 and ends 104 that terminate in bare leads 106 which are to be connected to the corresponding leads of other half coils. The half coil 100 is of the type used for the stator of a high voltage generator. The half coil 100 may be wrapped with a few to as many as 16 layers or more of the composite mica insulation utilizing a liquid resinous binder. After having been applied, the entire wrapping of composite mica insulation is ordinarily covered with one or more layers of glass fiber tape to provide for a surface more resistant to abrasion. To resist the abrading action that results from the relative movement of the final half coil in the slot of a magnetic stator core requires a surface provided with a strong, durable covering such as glass fiber tape. The completely taped half coil 100 is dried as described with respect to the winding 10 to remove volatiles, air and moisture therefrom. The half coil is then placed within an impregnating tank or pan 108 shaped to correspond to the coil in order that a minimum amount of the completely reactive composition will be needed to cover the coil. As shown in enlarged cross section in Fig. 7, the coil 100 will comprise a plurality of conductors 110, of copper or the like, with resin treated fibrous turn insulation 112 separating the conductors and uniting them into a rigid whole. The entire assembly of conductors 110-112 is wrapped with a plurality of layers 114 of the composite mica insulation and a final wrapping 116 of a glass fiber tape is applied about the exterior.

Immediately before being placed in the pan 108, the coil with the composite tape and superimposed exterior glass tape wrapping is placed in an oven and heated for several hours at a temperature of not more than 175° C. We have heated coils for 10 hours in an oven at a temperature of 140° C. and then allowed them to cool for 3 hours to a temperature of between 40° C. and 50° C. The coils are then placed in the pan 108 and disposed in a vacuum impregnation tank where a vacuum of less than 10 millimeters Hg absolute pressure is applied for several hours. The coils are warmer than room temperature when subjected to the vacuum and the heat thereof assists the vacuum in removing the volatile and gaseous materials therefrom. After evacuating, the coil 100 is entirely immersed in the completely reactive composition. Rapid and thorough impregnation has been secured under these conditions.

The impregnating of the coil with the completely reactive composition in detail is as follows. The impregnating pan 108 is disposed within a vacuum tank or the like where a vacuum may be applied to remove gases from the coil before the completely reactive composition 118 is introduced into the pan 108, though vacuum may be applied continuously until the composition covers the coil, or evacuation may be initiated during impregnation. The completely reactive composition 118 is introduced into the pan 108 in a quantity sufficient to cover completely the coil 100. After evacuation and subsequent application of the impregnating composition to cover the coil 100, pressure is applied to the surface of the composition by introducing an inert gas such as nitrogen or carbon dioxide at pressures of up to 50 p. s. i. to cause it to penetrate more readily into the interstices of the coil. After a suitable immersion period, the pan is withdrawn from the vacuum tank and the coil removed therefrom. The completely reactive composition is ordinarily retained quite well within the interstices of the coil and very little dripping occurs, except for superficial surface drainage. The slot section 102 of the coil is then wrapped with one or more layers of the impervious tape. Good success has been had with polyvinyl alcohol tape and the polyethylene glycolterephthalate tape previously mentioned for this purpose in connection with polyester-vinyl aryl compositions. The ends 104 of the coil 100 require compacting of the composite insulation as much as do the slot sections 102. For this purpose, it has been found that a compressed elastomeric confining pad may be disposed over the flat sides of the coil. Such compressed elastic confining means are set forth in detail in the copending patent application Serial No. 122,438, filed October 20, 1949, now Patent No. 2,601,243, and assigned to the assignee of the present invention. Briefly, the elastic confining pads comprise half round elastomeric members, for example of neoprene, which are tightly wrapped with a tape, usually cotton tape, so as to apply a substantial pressure on the flat sides of the coil.

Referring to Fig. 8 of the drawings, there is illustrated the molding, shaping and confining of the wrapped impregnated half coil 100 in a suitable jig. The slot section 102 is placed at the corner of a relatively fixed large angle member 120 and another angle member 122 is applied so as to confine the four sides of the coil 100 between the two angle members 120 and 122 as illustrated. A plurality of C clamps 124 are disposed along the length of the large channel member 120 to bring the channel member 124 thereagainst. The clamps 124 comprise a screw 126 operating on a block 128 fitting against the corner of the smaller angle member 122 so as to force the angle members toward each other and thereby confine and compress the slot portion of the coil 100 therebetween. The ends 104 are provided with elastomeric pads 130 disposed on either side of the flat face of the coil and the pads 130 are compressed with a tape 132 wrapped with sufficient tension to compress the elastomeric pads. The ends 104 are tied down against fixed bars 134 provided with suitable positioning wedges 136 to position and shape the ends 104 in a desired configuration with respect to the slot portion of the coil. It will be observed that thereby the impregnated half coil is not only shaped but the composite insulation therein is subjected to confinement to prevent its being lost during subsequent treatment. Also the composite insulation is being compacted to prevent bulging of the insulation or the formation of any undesired voids.

The half coil so confined and shaped is then heated for sufficient time to cure the applied completely reactive composition in the half coil 100. Good curing of the completely reactive composition has been secured by connecting the bare leads 106 of the half coil to a source of high amperage electrical current to generate heat internally in the coil. Current has been applied to the leads for one half hour to cause the copper temperature to reach 100° C. to initiate the curing of the composition. Thereafter the entire coil unit in the jig shown in Fig. 8 has been placed in an oven at a temperature of the order of 100° C. to 130° C. and the curing completed in from two to four hours. In some cases, we have subjected the coils to additional baking for from five to ten hours at temperatures of 125 to 140° C. though this is not absolutely necessary. After the polymerizable composition has been completely reacted to a thermostat state, the tape 132 may be removed, the C clamps 124 released permitting removal of the smaller angle member 122 and the shaped and formed coil with the solid thermoset completely reactive composition is ready for application to the stator of an electrical generator.

Certain extremely vital functions are performed by the impermeable tape wrapping applied to the coils after impregnation. The wrapping of the impermeable tape prevents exudation and loss of the completely reactive composition during the shaping, molding and curing processing steps. This wrapping enables the reactive composition to be shifted somewhat as portions of the mica tape into which it is impregnated are compacted more than other portions. This action prevents the formation of or the opening of voids or pockets in the composite insulation. Further, pressure applied to the impervious tape is hydraulically distributed within the various wrappings.

It has been found that the completely reactive compositions of the present invention are compatible with the liquid binders of the mica insulation, so that the completely reactive compositions penetrate readily through the composite mica tape and intermix, usually by mutual solution, in one another so that a relatively uniform liquid impregnant within the insulation results. For example a liquid polymethylmethacrylate will form a compatible thermoset solid in admixture with castor oil maleate-monostyrene; a liquid coumarone-indene polymer is compatible in admixture with thermoset diallyl phthalate; and liquid beta-pinene polymer in admixture with the composition of Example I forms a thermoset polymer. Accordingly upon curing there results a solid thermoset resinous impregnant bonding the mica and any other applied wrapping to one another and to the inner conductor. The thermoset completely reactive compositions disclosed, and in particular the polyestervinyl aryl compositions, while thermoset possess the property of becoming elastic at elevated temperatures sufficient to permit the conductor to move slightly with respect to the applied composite insulation.

Examples of other completely reactive compositions that may be employed for impregnating coils with the applied composite mica tape embodying a liquid binder are the following:

Example III

An acid half ester was prepared by reacting castor oil 100 parts, maleic anhydride 30 parts (mole ratio about 1:3) at 140° C. for two hours. This half ester when dissolved in 24.4 parts by weight of monstryrene and ½% by weight of benzoyl peroxide based on the weight of the entire mixture would polymerize to a solid by heating for one hour at a temperature of 125° C.

Other completely reactive compositions embodying castor oil that may be used in the practice of the invention are set forth in N. C. Foster Patent 2,484,215.

Example IV

|  | Moles |
|---|---|
| Maleic anhydride | 1 |
| Phthalic anhydride | 0.5 |
| Diethylene glycol | 1.5 |

The phthalic anhydride and diethylene glycol are admixed and heated to a temperature of 120° C. for 30 minutes, then the maleic anhydride is added and the reaction is continued for an additional 30 minutes at this temperature. The resulting resinous polyester is admixed with monostyrene in proportions of 60 parts of monostyrene to 40 parts of the polyester.

Example V

An unsaturated ester was prepared by reacting 600 parts by weight of tall oil, 82 parts by weight of pentaerythritol and 76 parts by weight of propylene glycol. Heating was continued at 150° C. for five hours at the end of which time the acid number was 7; then 98 parts of maleic anhydride was added and the reaction continued at 150° C. for three and one-half hours additionally. The acid number at the end of this time was 7.5. After cooling, 65 parts by weight of the resulting unsaturated resinous ester product was admixed with 35 parts by weight of monostyrene and with 0.5% by weight of tert-butyl-hydroperoxide and could be impregnated into wrapped coils.

Numerous other compositions are suitable for the practice of the process of this invention, and the following examples are illustrative of such other completely-reactive compositions:

Example VI

The polyester reaction product of 4 moles of maleic anhydride, 1 mole of adipic acid, and 5 moles of ethylene glycol, dissolved in an equal weight of diallyl phthalate.

Example VII

The polyester reaction product of 50 parts by weight of maleic anhydride and 54 parts by weight of diethylene glycol dissolved in monomeric vinyl acetate, in the proportion of 80 parts of the diethylene glycol maleate and 20 parts of the vinyl acetate.

Example VIII

Fumaric acid, 50 parts, and diethylene glycol, 50 parts, were reacted by heating and the resulting polyester product dissolved in monostyrene.

Example IX

The polyester reaction product of diethylene glycol, 13 parts, maleic anhydride, 28 parts, and tung oil, 7.5 parts, dissolved in an equal amount by weight of methyl methacrylate.

Example X

Diethylene glycol, 30 parts, maleic anhydride, 13 parts, and phthalic anhydride, 22 parts, were reacted and the resulting polyester dissolved in diallyl maleate in the proportion of 3 parts of the ester to 1 of the diallyl maleate.

Example XI

A mixture of 40 parts of diallyl phthalate and 60 parts of ethylene glycol maleate.

In order to prepare for somewhat more flexible and tougher thermoset resins from the completely reactive compositions, we have embodied therein a liquid compatible resinous polymer corresponding to the liquid resinous polymers used for the composite mica tape. These liquid polymers may be added in amounts of up to 5 to 15% of the weight of the completely reactive composition. Thus 5% by weight of polyalphamethyl styrene has been added to the compositions of Example I to III and to diallyl phthalate, and more flexible thermoset polymers resulted in each case upon curing the mixture. Similarly 5% by weight of the liquid polyester of azelaic acid and diethylene glycol of a molecular weight of approximately 1,500 has been added to these same completely reactive compositions to produce compatible, tough thermoset solids upon curing.

Example XII

A layer of mica flakes of a thickness of 5 mils was placed on a 1 mil thick sheet of rope paper. The mica flakes were treated by dripping thereon an amount equal to 5% of the weight of the mica and paper of the resinous reaction product of Example I, utilizing the polyester of adipic acid and fumaric acid reacted with propylene glycol to a viscosity of about 1000 poises. A second one mil thick sheet of rope paper was superimposed over the mica flakes and the resulting composite was rolled lightly to distribute the applied polyester throughout the tape. Generator half coils were taped with sixteen layers of the resulting tape and a layer of glass fiber tape was wrapped thereover. The coils were subjected to vacuum at an absolute pressure of below 5 mm. of Hg and heated to a temperature of 130° C. for several hours while so evacuated. The coils were then cooled to 50° C. and then vacuum impregnated with a completely reactive solution comprising 85% by weight of monostyrene and 15% by weight of the same polyester as employed in the binder for the mica tape, with 0.5% of benzoyl peroxide as a catalyst and 0.01% of quinhydrone. The coil was immersed in the solution for one hour under a vacuum at 10 mm. of Hg absolute pressure, and then for one hour with dry air at atmospheric pressure. The coil was withdrawn from the solution and, after draining, it was wrapped with one and one-half inch wide film tape of 1 mil thickness polyethylene glycol terephthalate polymer. The wrapped coil was put into a press forming the slot section to size and shape while the end turns were wrapped with the rubber forming pads as shown in Fig. 8. The coil was heated for four hours at 100° C. and then for 6 hours at 125° C. The heat treatment cured the applied resinous composition to a fully cured, thermoset state. The coil was taken out of the press and the rubber pads were removed. The applied polyethylene glycol-terephthalate film was stripped, leaving a finished fully insulated coil for heavy duty service.

To illustrate the beneficial properties possessed by coils produced by the present invention, a number of comparable coils were prepared in accordance with the best prior art practice, employing (1) asphalt bonded mica insulation impregnated with asphalt after being taped in accordance with the best practice and (2) coils prepared in accordance with the present invention. The coils prepared in accordance with the present invention were made by taping them with a mica tape utilizing polyalphamethylstyrene binder and impregnated in a completely reactive composition prepared by dissolving 15 parts by weight of the adipic-propylene glycol-maleate reaction product previously described under Example I and 85 parts by weight of monostyrene catalyzed with 0.5% by weight of benzoyl peroxide. The coils so impregnated with this resin were cured in accordance with the procedure described herein. The amount of mica and other solid insulation applied to the two sets of coils was substantially identical in weight and thickness.

Comparative tests of the two sets of coils were then made at various voltages over a range of temperatures to determine the power factor. The power factor-temperature curves of Fig. 9 were plotted from these tests and show a marked, sharp rise in power factor with temperature of the asphalt bonded coils when tested at both two kilovolts and sixteen kilovolts, respectively. By contrast, the coils prepared in accordance with the present invention, when tested at two kilovolts and sixteen kilovolts, had low and relatively flat power factor curves over the same temperature range, also as illustrated in Fig. 9. Furthermore, there is only a small change in power factor for the coils of the present invention when the voltage is increased from 2 kv. to 16 kv. which indicates a high degree of consolidation of the insulation. Breakdown strength tests made on these coils gave values of 300 volts per mil for the asphalt bonded coil, and 490 volts per mil for the coils prepared in accordance with the present invention. These data indicate the marked superiority of the coil insulation derived by the practice of the present invention. A conservative estimate of useful life of the present insulation is 10 times that of the best previous insulation used in industry, under the same conditions.

Figure 10:
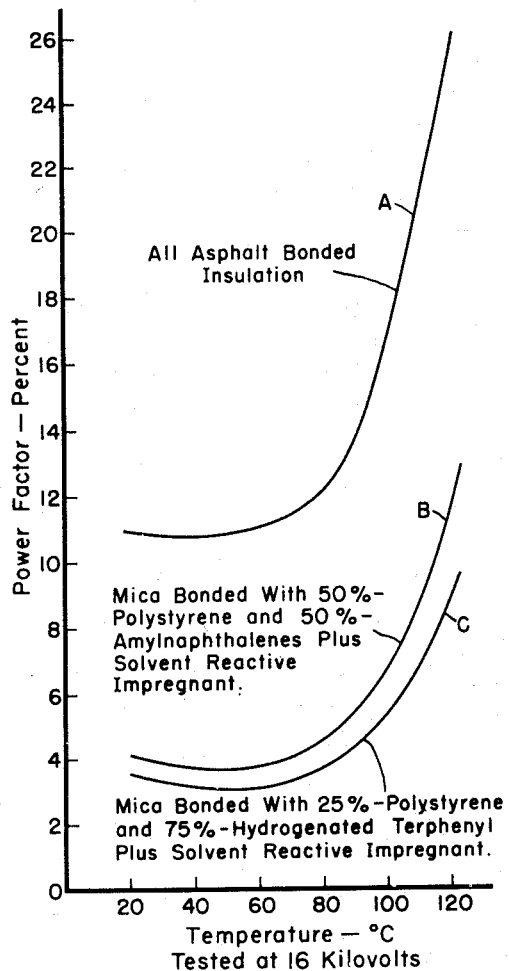
Fig. 10 is a graph plotting power factor against temperature for certain high voltage coils under 16 kilovolt test conditions.
Figure 11:
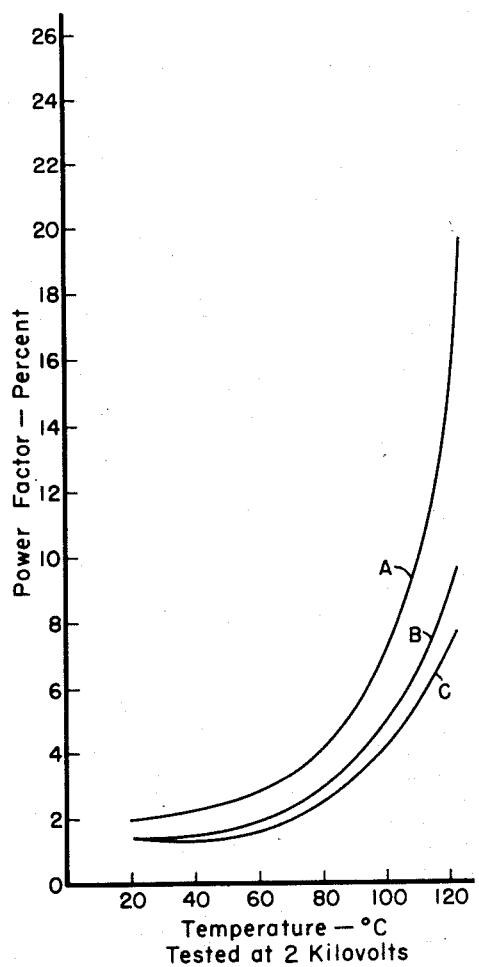
Fig. 11 is a graph plotting power factor against temperature for the high voltage coils of Fig. 10 under 2 kilovolt test conditions.

The curves A, B and C of Figs. 10 and 11 further illustrates the substantial improvements secured by the practice of the present invention. A series of test coils comparable in physical dimensions and in the amount of mica insulation applied were prepared in accordance with the best practice, as follows: (A) a coil with asphalt bonded mica insulation, impregnated with asphalt after applied to a coil; (B) a coil with a wrapping of mica tape prepared with a binder composed of 50% polystyrene of a molecular weight of 100,000, and 50% polyamyl naphthalene and then impregnated with the composition described under Example I in the proportion of 15 parts of the composition and 85 parts by weight of monostyrene and 0.5% of the total of benzoyl peroxide as a catalyst; and (C) a similar coil prepared from mica tape bonded with 25% polystyrene of a molecular weight of 100,000, and 75% hydrogenated terphenyl as indicated in Table II, the treatment of this coil being otherwise similar to the treatment of coil (B). The curves A, B and C are derived from these three coils respectively. When tested at 16 kilovolts as illustrated in Fig. 10, the asphalt bonded insulation rose from 11% power factor at a temperature of 20° C. to a 25% power factor at 120° C. test temperature. Coils (B) and (C) had a power factor of 4% and 3.5%, respectively, at a test temperature of 20° C. which increased to 11% and 9%, respectively, at 120° C.

Fig. 11 shows curves A, B and C derived by testing the same three coils prepared as in the tests for Fig. 10 at a potential of 2 kilovolts. It will be noted that the power-factor curve of the asphalt bonded coil (A) rises much faster with temperature than does the power-factor curve of coils (B) and (C). The curves in Figs. 10 and 11 clearly indicate that the insulation in coils (B) and (C) is much denser, more homogeneous, and freer from voids than the insulation of the asphalt bonded coil (A).

A further advantage accruing from the use of the completely reactive compositions of the present invention resides in the fact that the reactive compositions, when subjected to temperature of over 50° C. are elastomeric or rubber-like, so that they apply a restoring force tending to reduce the permanent displacement of the insulation with respect to the copper conductor within it by reason of the difference in thermal expansion of the various parts. Asphalts and similar previously employed insulating thermoplastics do not possess such restoring force characteristics. The compositions of the present invention will not bleed or exude from the coils under any condition of service, as compared to asphalts. Illustrative of this feature, a cycling test, in which coils disposed in a long laminated steel slot were subjected to an alternating heating to temperatures of 150° C. and then cooling to 15° C., each cycle being applied over a time of ninety-six minutes, was run for 1,000 cycles. The asphalt bonded coils showed a movement of the insulation at the center of a slot of about 0.5 inch, whereas no measurable movement of the insulation was observed with coils prepared in accordance with the present invention.

A further improvement obtainable by the practice of the present invention is that a single impregnation is sufficient to saturate and impregnate completely even the largest coils made in the industry today when carried out as herein described with the solvent reactive resins. This is attributable to the fact that the viscosity of the completely reactive resins is a very small fraction of the viscosity of the asphalt, even when the latter is heated to about 175° C., and similar conventional insulating materials that may be employed in accordance with the prior art practice. The viscosity of the resin employed in preparing the test coils from which Fig. 9 was plotted was 0.22 poises at 25° C., whereas asphalt has such a high viscosity at this temperature that it is not practically measurable. Even at 140° C. the viscosity of asphalt is over 20,000 poises, a value many times greater than the viscosity of the impregnating solution herein set forth.

The liquid resinous binders present in the mica tape disclosed herein are compatible with the liquid completely reactive resins disclosed herein and they even appear to assist the passage of the solvent reactive composition therethrough during impregnation. Ordinary mica bonds, such as shellac and the like, have been found to exert a marked retarding force on the penetration of impregnating compositions, which is so great in some cases that even after hours of application of pressure the composition will not have penetrated through more than four or five layers of the mica tape. By contrast, many tests have shown complete and thorough penetration of the completely reactive compositions of this invention into coils taped with 12 to 16 layers of mica tape prepared with low molecular weight polyalphamethylstyrene. The cooperation between the mica tape, as prepared herein, and the completely reactive composition therefore constitutes a critical feature, enabling the successful practice of the present invention that could not be secured with any other mica tape prepared heretofore.

While emphasis has been laid on the preparation of high voltage coils for generators, it will be understood that coils for motors for railway service, field coils and magnet coils, and similar apparatus, may be prepared in accordance with

We claim as our invention:

1. In the method of preparing an insulated conductor, the steps comprising wrapping the conductor with a tape comprising essentially a pliable sheet material, a layer of mica flakes disposed on the sheet material and a liquid binder composed of a liquid resinous composition of a viscosity of between 25 and 10,000 poises at 25° C., the liquid binder not exceeding 25% of the weight of the tape, heating the wrapped conductor to a temperature not in excess of 175° C. and applying a vacuum to remove moisture, air and other volatiles without removing more than a minor proportion of the liquid resinous composition from the applied tape wrapping, cooling the vacuum treated conductor to a temperature of below 50° C., vacuum impregnating the cooled conductor with a completely reactive liquid polymerizable composition comprising a monomeric compound having the group >C=C<, the polymerizable composition being compatible with the liquid resinous composition whereby the liquid polymerizable composition readily penetrates through the applied tape wrapping and fills all the interstices and spaces in the wrapped conductor, wrapping the exterior of the impregnated conductor with a flexible tape of a material relatively impervious to the polymerizable composition, applying heat and pressure about the impregnated conductor with the last mentioned wrapping thereon to polymerize the completely reactive composition to a solid, and thereafter removing the last mentioned impervious tape.

2. In the method of preparing an insulated conductor, the steps comprising wrapping the conductor with composite insulation composed of a sheet backing, mica flakes applied to the backing and a liquid binder composed of liquid resinous polymer having a viscosity of from 25 to 10,000 poises at 25° C., heating the wrapped conductor to a temperature of not in excess of 175° C. and applying a vacuum to the heated wrapped conductor to remove moisture, air and other volatiles without removing more than a minor proportion of the liquid resinous polymer binder from the composite insulation wrapping, cooling the vacuum treated conductor to a temperature of below 50° C., vacuum impregnating the cooled conductor with a completely polymerizable liquid resinous composition compatible with the liquid resinous polymer in the wrapping to fill all of the interstices and spaces in the conductor and its applied wrapping, wrapping the exterior of the impregnated conductor with a sheet covering of a material relatively impervious to the liquid impregnant and molding the conductor at a temperature sufficient to polymerize the completely polymerizable composition to a solid state.

3. The process of claim 2, wherein the liquid resinous polymer in the tape is composed of a low molecular weight polymer of an arylalkene compound.

4. The process of claim 2, wherein the liquid resinous polymer in the tape comprises a polyester resin.

5. The process of claim 2, wherein the completely reactive liquid polymerizable composition comprises (a) a polyester derived by reacting a polyhydric alcohol having no other reactive groups than the hydroxyl groups with a substantially molar equivalent of an acidic compound selected from the group consisting of alpha, beta-ethylenically unsaturated dicarboxylic acids and anhydrides thereof, and (b) an arylalkene monomeric compound functioning to dissolve the (a) polyester and co-polymerizable therewith.

6. The process of claim 2, wherein the completely reactive liquid polymerizable composition consists of (a) from 50% to 90% by weight of at least one monomeric arylalkene compound and (b) from 50% to 10% by weight of an unsaturated polyester derived by reacting by heating (A) a mixture of from 95% to 50% by weight of saturated acidic compounds and from 5% to 50% by weight of ethylenically unsaturated acidic compounds, the saturated acidic compounds composed of straight chain dicarboxylic acids having the carboxyl groups at the ends of the chains, the chains having from 2 to 10 carbon atoms, and no other reactive groups than the carboxyl groups, and the unsaturated acidic compounds being selected from the group consisting of alpha, beta-ethylenically unsaturated dicarboxylic acids and anhydrides thereof, and (B) a molar equivalent within ±10% of the mixture of acidic compounds of an aliphatic saturated glycol having no other reactive groups than the hydroxyl groups.

7. The process of claim 6, wherein the completely reactive liquid polymerizable composition consists of (a) from 50% to 90% by weight of monostyrene and (b) from 50% to 10% by weight of the polyester reaction product derived by heating from 6 to 10 mole percent of an acidic compound selected from the group consisting of fumaric acid and maleic anhydride, from 44 to 40 mole percent of adipic acid and 50 mole percent of propylene glycol.

8. The process of claim 6, wherein the completely reactive liquid polymerizable composition consists of (a) from 50% to 90% by weight of monostyrene and (b) from 50% to 10% by weight of the polyester reaction product derived by heating from 25 to 35 mole percent of sebacic acid, from 15 to 25 mole percent of maleic anhydride and 50 mole percent of propylene glycol.

9. An insulated conductor comprising an electrical conductor, a wrapping of mica tape disposed upon the conductor and a solid resin completely impregnating the tape, the solid resin comprising a cured compatible homogeneous mixture of (1) a minor proportion of a liquid resinous polymer having a viscosity of from 25 to 10,000 poises at 25° C., and (2) a major proportion of a thermoset polymer derived by polymerizing a completely reactive composition comprising a monomeric compound having the group >C=C<.

10. An insulated conductor comprising an electrical conductor, a wrapping of mica tape disposed upon the conductor and solid resin completely impregnating the tape, the solid resin comprising a cured compatible homogeneous mixture of (1) a minor proportion of a liquid resinous polymer having a viscosity of from 25 to 10,000 poises at 25° C., and (2) a major proportion of a thermostat polymer derived by polymerizing a completely reactive liquid polymerizable composition comprising (a) a polyester derived by reacting a polyhydric alcohol with acidic compound selected from the group consisting of alpha, beta-ethylenically unsaturated dicarboxylic acids and anhydrides thereof, and (b) an arylalkene monomeric compound functioning to dissolve the (a) polyester and co-polymerizable therewith.

11. An insulated conductor comprising an electrical conductor, a wrapping of mica tape disposed upon the conductor and a solid resin completely impregnating the tape, the solid resin comprising a cured compatible homogeneous mixture of (1) a minor proportion of a liquid resinous polymer having a viscosity of from 25 to 10,000 poises at 25° C. and (2) a major proportion of a thermostat polymer derived by polymerizing a completely reactive liquid polymerizable composition consisting of (a) from 50% to 90% by weight of at least one monomeric arylalkene compound and (b) from 50% to 10% by weight of an unsaturated polyester derived by reacting by heating (A) a mixture of from 95% to 50% by weight of saturated and from 5% to 50% by weight of unsaturated acidic compounds, the saturated acidic compounds composed of straight chain dicarboxylic acids having the carboxyl groups at the ends of the chains, the chains having from 2 to 10 carbon atoms, and no other reactive groups than the carboxyl groups, and the unsaturated acidic compounds being selected from the group consisting of alpha, beta-ethylenically unsaturated dicarboxylic acids and anhydrides thereof, and (B) a molar equivalent within ±10% of the mixture of acidic compounds of an aliphatic saturated glycol having no other reactive groups than the hydroxyl groups.

12. An insulated conductor comprising an electrical conductor, a wrapping of mica tape disposed upon the conductor and a solid resin comprising a cured compatible homogeneous mixture of (1) a minor proportion of a liquid resinous polymer having a viscosity of from 25 to 10,000 poises at 25° C. and (2) a major proportion of a thermoset polymer derived by polymerizing a completely reactive liquid polymerizable composition consisting of (a) from 50% to 90% by weight of monostyrene and (b) from 50% to 10% by weight the polyester reaction product derived by heating from 7 to 10 mole percent of maleic anhydride, from 43 to 40 mole percent of adipic acid and 50 mole percent of propylene glycol.

13. In the method of preparing a winding for an electrical machine, the winding comprising a slot portion and ends which ends are to be connected to other ends, the steps comprising wrapping the entire length of the winding conductor with a plurality of layers of a composite tape, the tape comprising essentially two superimposed sheets of pliable material, a layer of mica flakes disposed between the two superimposed sheets, and a liquid binder applied to the layer of mica flakes and the surfaces of the sheets of pliable material in contact with the mica flakes the binder composed of a liquid, relatively non-volatile, resinous polymer of a viscosity of between 25 and 10,000 poises at 25° C., the liquid binder not exceeding 7% of the weight of the composite tape, applying a final wrapping of a tape consisting of glass fibers, heating the winding with the applied layers of tapes to a temperature not exceeding 175° C., applying a vacuum thereto to remove moisture, air and other volatiles without removing more than a minor proportion of the liquid resinous polymer binder, cooling the vacuum treated winding to a temperature of less than 50° C., vacuum impregnating the cooled winding with a completely reactive polymerizable composition comprising a monomeric compound having the group $H_2C=C<$, the polymerizable composition being compatible with the liquid resinous binder whereby the liquid polymerizable composition readily penetrates through the composite tape wrapping to the conductor and fills all the interstices and spaces in the wrapped winding, applying over the tape of glass fibers a relatively liquid-tight layer of a flexible tape of a resinous material impervious to and insoluble in the polymerizable composition, placing the wrapped, impregnated winding in a confining mold to form the wrapped winding to desired cross-sectional shape and to shape the slot-section portion of the winding, and heating the confined winding to polymerize the completely reactive polymerizable composition to a solid resin.

14. In the method of preparing a winding for an electrical machine, the winding comprising a slot portion and ends which ends are to be connected to other ends, the steps comprising wrapping the entire length of the winding conductor with a plurality of layers of a composite tape, the composite tape comprising essentially two superimposed sheets of pliable material, a layer of mica flakes disposed between the two superimposed sheets, and a liquid binder applied to the layer of mica flakes and the surfaces of the sheets of pliable material in contact with the mica flakes, the binder composed of a liquid, relatively non-volatile, resinous polymer of a viscosity of between 25 and 10,000 poises at 25° C., the liquid binder not exceeding 7% of the weight of the composite tape, applying a final wrapping of a tape consisting of glass fibers, heating the winding with the applied layers of tapes to a temperature not exceeding 175° C., applying a vacuum thereto to remove moisture, air and other volatiles without removing more than a minor proportion of the liquid resinous polymer binder, cooling the vacuum treated winding to a temperature of less than 50° C., vacuum impregnating the cooled winding with a completely reactive polymerizable composition comprising a monomeric compound having the group $H_2C=C<$, the polymerizable composition being compatible with the liquid resinous binder whereby the liquid polymerizable composition readily penetrates through the composite tape wrapping to the conductor and fills all the interstices and spaces in the wrapped winding, applying over the tap of glass fibers a relatively liquid-tight layer of a flexible tape of a resinous material impervious to and insoluble in the polymerizable composition to retain the composition in the wrappings, placing the wrapped, impregnated winding in a confining mold to form the wrapped winding to desired cross-sectional shape and to shape the slot-section portion of the winding, placing a compressed elastic confining means along the ends of the winding, shaping the ends of the winding to the desired configuration, heating the confined winding to polymerize the completely reactive polymerizable composition to a solid resin, removing the cured winding from the confining mold, removing the compressed elastic confining means from the winding ends, and removing the liquid tight layer of flexible tape.

15. In the method of producing a winding for an electrical machine, the winding comprising a plurality of conductors and having a slot portion and ends which ends are to be connected to other ends in the electrical machine, the steps comprising applying a bonding resinous insulation to the plurality of conductors and bonding the conductors with the resinous insulation under heat and pressure to form them into the winding and to shape the whole to provide the slot portion and ends, wrapping the formed and shaped winding with a plurality of layers of a composite tape, the tape comprising essentially two superimposed sheets of pliable material, a layer of mica flakes disposed between the two superimposed sheets, and a liquid binder applied to the layer of mica flakes and the surfaces of the sheets of pliable material in contact with the mica flakes, the binder composed of a liquid, relatively non-volatile, resinous polymer of a viscosity of between 25 and 10,000 poises at 25° C., the liquid binder not exceeding 7% of the weight of the composite tape, applying a final wrapping of a tape consisting of glass fibers, heating and winding with the applied layers of tapes to a temperature not exceeding 175° C., applying a vacuum thereto to remove moisture, air and other volatiles without removing more than a minor proportion of the liquid resinous polymer binder, cooling the vacuum treated winding to a temperature of less than 50° C., vacuum impregnating the cooled winding with a completely reactive polymerizable composition comprising a monomeric compound having the group $H_2C=C<$, the polymerizable composition being compatible with the liquid resinous binder whereby the liquid polymerizable composition readily penetrates through the composite tape wrapping to the conductor and fills all the interstices and spaces in the wrapped winding, applying over the tape of glass fibers a relatively liquid-tight layer of a flexible tape of a resinous material impervious to and insoluble in the polymerizable composition, placing the wrapped, impregnated winding in a confining mold to form the wrapped winding to desired cross-sectional shape and to shape the slot section portion of the winding, and heating the confined winding to polymerize the completely reactive polymerizable composition to a solid resin.

16. In the method of producing a winding for an electrical machine, the winding comprising a plurality of conductors and having a slot portion and ends which ends are to be connected to other ends in the electrical machine, the steps comprising applying a bonding resinous insulation to the plurality of conductors and bonding the conductors with the resinous insulation under heat and pressure to form them into the winding and to shape the whole to provide the slot portion and ends, wrapping the formed and shaped winding with a plurality of layers of a composite tape, the tape comprising essentially two superimposed sheets of pliable material, a layer of mica flakes disposed between the two superimposed sheets, and a liquid binder applied to the layer of mica flakes and the surfaces of the sheets of pliable material in contact with the mica flakes, the binder composed of a liquid, relatively non-volatile, resinous polymer of a viscosity of between 25 and 10,000 poises at 25° C., the liquid binder not exceeding 7% of the weight of the composite tape, applying a final wrapping of a tape consisting of glass fibers, heating the winding with the applied layers of tapes to a temperature not exceeding 175° C., applying a vacuum thereto to remove moisture, air and other volatiles without removing more than a minor proportion of the liquid resinous polymer binder, cooling the vacuum treated winding to a temperature of less than 50° C., vacuum impregnating the cooled winding with a completely reactive polymerizable composition comprising a monomeric compound having the group $H_2C=C<$, the polymerizable composition being compatible with the liquid resinous binder whereby the liquid polymerizable composition readily penetrates through the composite tape wrapping to the conductor and fills all the interstices and spaces in the wrapped winding, applying over the tape of glass fibers a relatively liquid-tight layer of a flexible tape of a resinous material impervious to and insoluble in the polymerizable composition, placing the wrapped, impregnated winding in a confining mold to form the wrapped winding to desired cross-sectional shape and to shape the slot-section portion of the winding, placing a compressed elastic confining means along the ends of the winding, shaping the ends of the winding to the desired configuration, heating the confined winding to polymerize the completely reactive polymerizable composition to a solid resin, removing the cured winding from the confining mold, removing the compressed elastic confining means from the winding end, and removing the liquid tight layer of flexible tape.

17. In the method of preparing an insulated conductor, the steps comprising wrapping the conductor with a tap comprising essentially a pliable sheet material, a layer of mica flakes disposed on the sheet material and a liquid binder composed of a liquid resinous polymer of a viscosity of between 25 and 10,000 poises at 25° C., the liquid binder not exceeding 7% of the weight of the tape, heating the wrapped conductor to a temperature not in excess of 175° C., cooling the wrapped conductor to a temperature not substantially in excess of 50° C., applying a vacuum to the cooled conductor to withdraw volatiles therefrom, the heating and vacuum not removing more than a minor proportion of the liquid resinous polymer binder from the wrapping, vacuum impregnating the cooled conductor with a completely reactive liquid polymerizable composition comprising a monomeric compound having the group $H_2C=C<$, the polymerizable composition being compatible with the liquid resinous polymer whereby the liquid polymerizable composition readily penetrates through the applied tape wrapping and fills all the interstices and spaces in the wrapped conductor, wrapping the exterior of the impregnated conductor with a flexible tape of a material relatively impervious to the polymeriable composition, applying heat and pressure about the impregnated conductor with the last mentioned wrapping thereon to polymerize the completely reactive composition to a solid and thereafter removing the last mentioned impervious tape.

18. In the method of preparing a winding for an electrical machine, the winding comprising a slot portion and ends which ends are to be connected to other ends, the steps comprising wrapping the entire length of the winding conductor with a plurality of layers of a composite tape, the tape comprising essentially two superimposed sheets of pliable material, a layer of mica flakes disposed between the two superimposed sheets, and a liquid binder applied to the layer of mica flakes and the surfaces of the sheets of pliable material in contact with the mica flakes, the binder composed of a liquid, relatively non-volatile, resinous polymer of a viscosity of between 25 and 10,000 poises at 25° C., the liquid binder not exceeding 7% of the weight of the composite tape, applying a final wrapping of a tape consisting of glass fibers, heating the winding with the applied layers of tapes to a temperature not exceeding 175° C., cooling the wrapper winding to a temperature not substantially in excess of 50° C., applying a vacuum to the cooled conductor to withdraw volatiles therefrom, the heating and vacuum not removing more than a minor proportion of the liquid resinous polymer binder from the wrapping, vacuum impregnating the cooled winding with a completely reactive polymerizable composition comprising a monomeric compound having the group $H_2C{=}C{<}$, the polymerizable composition being compatible with the liquid resinous binder whereby the liquid polymerizable composition readily penetrates through the composite tape wrapping to the conductor and fills all the interstices and spaces in the wrapped winding, applying over the tape of glass fibers a relatively liquid-tight layer of a flexible tape of a resinous material impervious to and insoluble in the polymerizable composition, placing the wrapped, impregnated winding in a confining mold to form the wrappings to desired cross-sectional shape and to shape the slot-section portion of the winding, and heating the confined winding to polymerize the completely reactive polymerizable composition to a solid resin.

19. In the method of preparing a winding for an electrical machine, the winding comprising a slot portion and ends which ends are to be connected to other ends, the steps comprising wrapping the entire length of the winding conductor with a plurality of layers of a composite tape, the tape comprising essentially two superimposed sheets of pliable material, a layer of mica flakes disposed between the two superimposed sheets, and a liquid binder applied to the layer of mica flakes and the surfaces of the sheets of pliable material in contact with the mica flakes, the binder composed of a liquid, relatively non-volatile, resinous polymer of a viscosity of between 25 and 10,000 poises at 25° C., the liquid binder not exceeding 7% of the weight of the composite tape, applying a final wrapping of a tape consisting of glass fibers, heating the winding with the applied layers of tapes to a temperature not exceeding 175° C., cooling the wrapped winding to a temperature not substantially in excess of 50° C., applying a vacuum to the cooled conductor to withdraw volatiles therefrom, the heating and vacuum not removing more than a minor proportion of the liquid resinous polymer binder from the wrapping, vacuum impregnating the cooled winding with a completely reactive polymerizable composition comprising a monomeric compound having the group $H_2C{=}C{<}$, the polymerizable composition being compatible with the liquid resinous binder whereby the liquid polymerizable composition readily penetrates through the composite tape wrapping to the conductor and fills all the interstices and spaces in the wrapped winding, applying over the tape of glass fibers a relatively liquid-tight layer of a flexible tape of a resinous material impervious to and insoluble in the polymerizable composition, placing the wrapped, impregnated winding in a confining mold to form the wrappings to desired cross-sectional shape and to shape the slot-section portion of the winding, placing a compressed elastic confining means along the ends of the winding, shaped the ends of the winding to the desired configuration, heating the confined winding to polymerize the completely reactive polymerizable composition to a solid resin, removing the cured winding from the confining mold, removing the compressed elastic confining means from the winding ends, and removing the liquid tight layer of flexible tape.

20. In the method of producing a winding for an electrical machine, the winding comprising a plurality of conductors and having a slot portion and ends which ends are to be connected to other ends in the electrical machine, the steps comprising applying a bonding resinous insulation to the plurality of conductors and bonding the conductors with the resinous insulation under heat and pressure to form them into the winding and to shape the whole to provide the slot portion and ends, wrapping the formed and shaped winding with a plurality of layers of a composite tape, the tape comprising essentially two superimposed sheets of pliable material, a layer of mica flakes disposed between the two superimposed sheets, and a liquid binder applied to the layer of mica flakes and the surfaces of the sheets of pliable material in contact with the mica flakes, the binder composed of a liquid, relatively non-volatile, resinous polymer of a viscosity of between 25 and 10,000 poises at 25° C., the liquid binder not exceeding 25% of the weight of the composite tape, applying a final wrapping of a tape consisting of glass fibers, heating the winding with the applied layers of tapes to a temperature not exceeding 175° C., cooling the wrapped winding to a temperature not substantially in excess of 50° C., applying a vacuum to the cooled conductor to withdraw volatiles therefrom, the heating and vacuum not removing more than a minor proportion of the liquid resinous polymer binder from the wrapping, vacuum impregnating the cooled winding with a completely reactive polymerizable composition comprising a monomeric compound having the group $H_2C{=}C{<}$, from 0.1 to 2% by weight of a vinyl polymerization catalyst being incorporated in the composition, the polymerizable composition being compatible with the liquid resinous binder whereby the liquid polymerizable composition readily penetrates through the composite tape wrapping to the conductor and fills all the interstices and spaces in the wrapped winding, applying over the tape of glass fibers a relatively liquid-tight layer of a flexible tape of a resinous material impervious to and insoluble in the polymerizable composition, placing the wrapped, impregnated winding in a confining mold to form the wrappings to desired cross-sectional shape and to shape the slot section portion of the winding, and heating the confined winding to polymerize the completely reactive polymerizable composition to a solid resin.

21. In the method of producing a winding for an electrical machine, the winding comprising a plurality of conductors and having a slot portion and ends which ends are to be connected to other ends in the electrical machine, the steps comprising applying a bonding resinous insulation to the plurality of conductors and bonding the conductors with the resinous insulation under heat and pressure to form them into the winding and to shape the whole to provide the slot portion and ends, wrapping the formed and shaped winding with a plurality of layers of a composite tape, the tape comprising essentially two superimposed sheets of pliable material, a layer of mica flakes disposed between the two superimposed sheets, and a liquid binder applied to the layer of mica flakes and the surfaces of the sheets of pliable material in contact with the mica flakes, the binder composed of a liquid, relatively non-volatile, resinous polymer of a viscosity of between 25 and 10,000 poises at 25° C., the liquid binder not exceeding 7% of the weight of the composite tape, applying a final wrapping of a tape consisting of glass fibers, heating the winding with the applied layers of tapes to a temperature not exceeding 175° C., cooling the wrapped winding to a temperature not substantially in excess of 50° C., applying a vacuum to the cooled conductor to withdraw volatiles therefrom, the heating and vacuum not removing more than a minor proportion of the liquid resinous polymer binder from the wrapping, vacuum impregnating the cooled winding with a completely reactive polymerizable composition comprising a monomeric compound having the group $H_2C=C<$, the polymerizable composition being compatible with the liquid resinous binder whereby the liquid polymerizable composition readily penetrates through the composite tape wrapping to the conductor and fills all the interstices and spaces in the wrapped winding, applying over the tape of glass fibers a relatively liquid-tight layer of a flexible tape of a resinous material impervious to and insoluble in the polymerizable composition, placing the wrapped, impregnated winding in a confining mold to form the wrappings to desired cross-sectional shape and to shape the slot-section portion of the winding, placing a compressed elastic confining means along the ends of the winding, shaping the ends of the winding to the desired configuration, heating the confined winding to polymerize the completely reactive polymerizable composition to a solid resin, removing the cured winding from the confining mold, removing the compressed elastic confining means from the winding ends, and removing the liquid-tight layer of flexible tape.

22. The method of preparing an insulated coil comprising a plurality of turns of conductors insulated from one another and ground insulation applied about the assembled turns, comprising the steps of wrapping the assembled turns of the conductor with insulation comprising a sheet backing, mica flakes applied to the backing and a viscous fluid binder uniting the mica flakes and the sheet backing, the binder having a viscosity of between 100 and 25,000 poises at 25° C. and composed of from 15% to 75% by weight of polystyrene of a molecular weight of between 30,000 and 250,000 and from 85% to 25% by weight of a plasticizer selected from the group of liquid polycyclic hydrocarbons boiling above 270° C. having a viscosity of between 0.5 and 5 poises at 25° C. consisting of terphenyls hydrogenated at least 40% and the mono-, di-, and polyamyl naphthalenes, subjecting the wrapped coil to a temperature of not in excess of 175° C. and a vacuum to remove moisture and other volatiles, cooling the vacuum treated coil to a temperature of below 50° C., a substantial portion of the viscous fluid binder remaining in the coil after this treatment, vacuum impregnating the coil with a liquid, completely polymerizable resinous composition composed of (a) from 50% to 90% by weight of at least one polymerizable vinyl aryl compound having the formula:

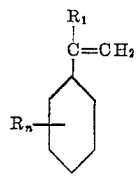

where $R_1$ represents a radical from the group consisting of hydrogen and methyl radicals, and $R_n$ represents a substituted radical selected from the group consisting of methyl and halide radicals and $n$ represents a positive integer from 1 to 2 and (b) the balance, from 50% to 10% by weight, being an unsaturated ester reaction product derived by reacting (A) a mixture of at least one acidic compound from the group consisting of maleic acid, maleic anhydride, citraconic acid, citraconic anhydride and fumaric acid and a saturated straight chain dicarboxylic acid having the carboxyl groups at the ends of the straight chain, the chain having from 2 to 10 carbon atoms, and no other reactive groups, the proportions of unsaturated acidic compound in the mixture varying from 10 to 50 mol percent, with (B) a molar equivalent of an aliphatic saturated glycol having no other reactive groups than the hydroxyl groups, wrapping the impregnated coil with an impervious sheet covering, and molding the wrapped coil under pressure at a temperature sufficient to polymerize the completely polymerizable resinous composition to a solid state and to shape the coil.

23. The method of preparing an insulated coil comprising a plurality of turns of conductors insulated from one another and ground insulation applied about the assembled turns, comprising the steps of wrapping the assembled turns of the conductor with insulation comprising a sheet backing, mica flakes applied to the backing and a viscous fluid binder uniting the mica flakes and the sheet backing, the binder having a viscosity of between 100 and 25,000 poises at 25° C. and composed of from 15% to 75% by weight of polystyrene of a molecular weight of between 30,000 and 250,000 and from 85% to 25% by weight of a plasticizer selected from the group of liquid polycyclic hydrocarbons boiling above 270° C. having a viscosity of between 0.5 and 5 poises at 25° C. consisting of terphenyl hydrogenated at least 40% and the mono-, di-, and polyamyl naphthalenes, subjecting the wrapped coil to a temperature of not in excess of 175° C. and a vacuum to remove moisture and other volatiles, cooling the vacuum treated coil to a temperature of below 50° C., a substantial portion of the viscous fluid binder remaining in the coil after this treatment, vacuum impregnating the coil with a liquid, completely polymerizable resinous composition composed of (a) from 50% to 90% by weight of monostyrene and (b) the balance, from 50% to 10% by weight, being the ester reaction product of between 5 and 10 mole percent of maleic anhyride, between 45 and 40 mole percent of adipic acid and 50 mole percent of propylene glycol, wrapping the impregnated coil with an impervious sheet covering and molding the wrapped coil under pressure at a temperature sufficient to polymerize the resinous composition to solid state and to shape the coil.

24. The method of preparing an insulated coil comprising a plurality of turns of conductors insulated from on another and ground insulation applied about the assembled turns, comprising the steps of wrapping the assembled turns of the conductor with insulation comprising a sheet backing, mica flakes applied to the backing and a viscous fluid binder uniting the mica flakes and the sheet backing, the binder having a viscosity of between 100 and 25,000 poises at 25° C. and composed of from 15% to 75% by weight of polystyrene of a molecular weight of between 30,000 and 250,000 and from 85% to 25% by weight of a plasticizer selected from the group of liquid polycyclic hydrocarbons boiling above 270° C. having a viscosity of between 0.5 and 5 poises at 25° C. consisting of terphenyl hydrogenated at least 40% and the mono-, di-, and polyamyl naphthalenes, subjecting the wrapped coil to a temperature of not in excess of 175° C. and a vacuum to remove moisture and the other volatiles, cooling the vacuum treated coil to a temperature of below 50° C., a substantial portion of the viscous fluid binder remaining in the coil after this treatment, vacuum impregnating the coil with a liquid, completely polymerizable resinous composition composed of (a) from 50% to 90% by weight of monostyrene and (b) the balance, from 50% to 10% by weight, being the ester reaction product of 30% of sebacic acid, 20% of maleic anhydride and 50 mole percent of propylene glycol, wrapping the impregnated coil with an impervious sheet covering and molding the wrapped coil under pressure at a temperature sufficient to polymerize the resinous composition to solid state and to shape the coil.

25. In the method of preparing an insulated coil comprising a metallic conductor, the steps comprising wrapping the conductor with a composite tape, the tape comprising sheet backing, a layer of mica flakes applied to the backing and viscous fluid binder having a viscosity of between 100 and 25,000 poises at 25° C., the binder composed of from 15% to 75% by weight of polystyrene of a molecular weight of from 30,000 to 250,000 and from 85% to 25% by weight of a liquid plasticizer boiling at about 270° C. and higher for the polystyrene, heating the wrapped coil to a temperature of not in excess of 175° C. to remove moisture and other volatiles without removing any substantial amount of the liquid binder in the composite tape, applying a vacuum to the heat-treated coil to remove air and the like therefrom, impregnating the evacuated coil with a completely polymerizable fluid, thermosettable, solvent reactive varnish comprising polymerizable monomers having the group

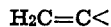

and a small effective amount of a vinyl type polymerization catalyst dissolved in the solvent reactive varnish, the solvent reactive varnish readily penetrating through the composite mica insulation due to the liquid binder dissolving compatibly in the solvent reactive varnish, wrapping the impregnated coil with an impervious sheet covering to retain the impregnated solvent reactive varnish in the coil during subsequent processing, placing the wrapped coil in a mold to shape the coil to desired size and form, heating the coil while in the mold to cure the solvent reactive varnish, removing the coil from the mold, and unwrapping the last applied impervious sheet covering.

26. The method of preparing an insulated coil comprising a metallic conductor, the steps comprising wrapping the conductor with a composite tape, the tape comprising sheet backing, a layer of mica flakes applied to the backing and a viscous fluid binder having a viscosity of between 100 and 25,000 poises at 25° C., the binder composed of from 15% to 75% by weight of a solid thermoplastic resin and from 85% to 25% by weight of a liquid plasticizer boiling about 270° C. and higher for the solid resin, heating the wrapped coil to a temperature of not in excess of 175° C. to remove moisture and other volatiles without removing any substantial amount of the liquid binder in the composite type, applying a vacuum to the heat-treated coil to remove air and the like therefrom, impregnating the evacuated coil with a completely polymerizable fluid, thermosettable, solvent reactive varnish comprising polymerizable monomers having the group $H_2C=C<$ and a small effective amount of a vinyl.

27. The method of preparing an insulated coil comprising a metallic conductor comprising a plurality of metallic conducting members, insulation applied to metallic members including a resin, the steps comprising wrapping the conductor with a composite tape, the tape comprising sheet backing, a layer of mica flakes applied to the backing and a viscous fluid binder having a viscosity of between 100 and 25,000 poises at 25° C., the binder composed of from 15% to 75% by weight of polystyrene of a molecular weight of from 30,000 to 250,000 and from 85% to 25% by weight of a liquid plasticizer boiling at about 270° C. and higher for the polystyrene, heating the wrapped coil to a temperature of not in excess of 175° C. to remove moisture and other volatiles without removing any substantial amount of the liquid binder in the composite tape, applying a vacuum to the heat-treated coil to remove air and the like therefrom, impregnating the evacuated coil with a completely polymerizable fluid, thermosettable, solvent reactive varnish comprising polymerizable monomers having the group $H_2C=C<$ and a small effective amount of a vinyl type polymerization catalyst dissolved in the solvent reactive varnish, the solvent reactive varnish readily penetrating through the composite mica insulation due to the liquid binder dissolving compatibly in the solvent reactive varnish, wrapping the impregnated coil with an impervious sheet covering to retain the impregnated solvent reactive varnish in the coil during subsequent processing, placing the wrapped coil in a mold to shape the coil to desired size and form, heating the coil while in the mold to cure the solvent reactive varnish, removing the coil from the mold, and unwrapping the last applied impervious sheet covering.

LEO J. BERBERICH.
HAROLD M. PHILOFSKY.

No references cited.